INVENTORS
LASZLO JOSEPH BOLLYKY

BY
*Charles J. Fickey*
ATTORNEY

United States Patent Office 3,775,336
Patented Nov. 27, 1973

3,775,336
HIGH INTENSITY CHEMILUMINESCENT SYSTEM WITH WEAKLY BASIC SALT-TYPE CATALYST
Laszlo Joseph Bollyky, Stamford, Conn., assignor to American Cyanamid Company, Stamford, Conn.
Continuation of abandoned application Ser. No. 813,864, Apr. 7, 1969. This application Sept. 7, 1971, Ser. No. 178,496
Int. Cl. C09k 3/00
U.S. Cl. 252—188.3 CL                8 Claims

ABSTRACT OF THE DISCLOSURE

This invention relates to a chemiluminescent lighting system of relatively short life and high intensity using basic salts as the catalyst.

---

This is a continuation of application Ser. No. 813,864, filed Apr. 7, 1969, now abandoned.

A practical chemical lighting system should be an efficient producer of chemiluminescent light, storage stable, simple to operate, and safe to use. Additionally, for broad use a practical system should be capable of formulation to meet a variety of brightness and lifetime requirements for a variety of applications. The oxalic ester-hydrogen peroxide-fluorescer chemiluminescent reaction has the inherent capability of meeting these requirements, as disclosed in co-pending application Ser. No. 619,140, filed Feb. 28, 1967, now U.S. Pat. 3,597,-362. This oxalic ester reaction provides substantial light emission when an oxalic ester, preferably an electronegatively substituted aromatic oxalate, is reacted with hydrogen peroxide, a fluorescer, and optionally a catalyst in a solvent. Formulation of a practical chemical lighting system based on this reaction requires the selection of oxalates, fluorescers, catalysts and solvents which optimize brightness and lifetime. Moreover, the constituents must optimumly be selected to accommodate their formulation into two reactive components which separately have extended storage stabilities and which generate useful light when combined. The distribution of the constituents between the two components is also critical in terms of storage stability and performance. The constituents should also be selected to accommodate low toxicity, low freezing point, and high flash point to provide for safe operation over a range of temperature. These latter properties are determined to a large extent by the solvent or solvents selected for the two reactive components, since the solvent may constitute substantially more than 90% of the combined system. Thus the selection of solvents for each component is critical in terms of safety as well as in terms of performance and storage stability.

For most applications a maximum light output per unit volume is required during some specified time period. The light output is measured in terms of light capacity (L.C.=lumen hours 1⁻¹). The light capacity is proportional to the concentration of oxalic ester (M) and the quantum yield (QY) according to Equation 1. The constant $4.07 \times 10^4$ lumen hours einstein⁻¹ defines the sensitivity of the human eye to the yellow (555 m$\mu$) light and P is the photoptic factor which compares the ability of the eye to see a given wavelength of light with the ability to see yellow light. In principle, the light capacity of the chemiluminescent reaction, with a given constant quantum yield, can be increased by increasing the oxalic ester concentration and by selecting a fluorescer which has a high photoptic factor.

(1)      $LC = 4.07 \times 10^4 \times M \times QY \times P$

Increasing the light capacity by increasing the oxalic ester concentration is limited by the solubility of strongly chemiluminescent oxalic esters and by the tendency of the quantum yield to decrease at high oxalic ester concentrations. The latter problem can be moderated by the addition of tetrabutyl ammonium salt additives, as disclosed in copending, commonly assigned application Ser. No. 675,141, filed Oct. 13, 1967, refiled as a continuation application Ser. No. 115,734, now U.S. Pat. 3,704,231. Therefore attention should be given first to the solubility problem.

A two-component, liquid phase oxalate ester chemical light system must comprise an "oxalate component" comprising an oxalate ester and a solvent, and a "peroxide component" comprising hydrogen peroxide and a solvent. In addition an efficient fluorescer must be contained in one of the components; and any catalyst, necessary for intensity and lifetime control, must be contained in one of the components. The oxalate component must provide an oxalate ester-solvent combination which permits suitable ester solubility and which permits storage stability. The peroxide component must provide a hydrogen peroxide-solvent combination which permits suitable hydrogen peroxide solubility and permits storage stability. The solvents for the two components may be different but should be miscible. At least one solvent must solubilize the efficient fluorescer and at least one solvent should solubilize an efficient catalyst. The fluorescer and catalyst must be placed so as to permit both solubility and storage stability in the final components.

In copending, commonly assigned application Ser. No. 813,973, filed Apr. 7, 1969, now abandoned there is disclosed a superior oxalic ester chemical lighting system satisfying all requirements which comprises two liquid phase components wherein one component (the oxalate component) is selected from the group comprising (1) at least 0.01 M (preferably at least 0.03 M) bis(2,4,6-trichlorophenyl)oxalate and at least 0.001 M (preferably at least 0.002 M) fluorescer selected from the group comprising 9,10-bis(phenylethynyl)anthracene and 5,12-bis-(phenylethynyl)tetracene, 9,10-diphenylanthracene, perylene, 16,17 - dihexyloxyviolanthrone and an aromatic solvent such as benzene, chlorobenzene, ethylbenzene, dimethyl phthalate and preferably o-dichlorobenzene, ethyl benzoate, butyl benzoate and 1,3-butylene glycol dibenzoate; and (2) the component of the first group containing additionally at least 0.01 M (preferably at least 0.05 M) tetraalkyl ammonium perchlorate (such as tetrabutylammonium perchlorate); and wherein the second component (the peroxide component) is selected from the group comprising (1) at least 0.01 M hydrogen peroxide (preferably at least 0.10 M hydrogen peroxide) in a tertiary alcohol such as t-butyl alcohol, 3-methyl-3-pentanol, 3,6-dimethyloctanol-3 or an ester such as dimethyl phthalate; (2) at least 0.01 M hydrogen peroxide (preferably at least 0.10 M hydrogen peroxide) and a catalyst in the concentration range $1 \times 10^{-4}$ M to $2 \times 10^{-2}$ M comprising the anion of a carboxylic acid or phenol having an aqueous dissociation constant between about $1 \times 10^{-6}$ and $1 \times 10^{-1}$ (preferably between about $5 \times 10^{-4}$ and about $5 \times 10^{-2}$) (examples are sodium salicylate, tetrabutylammonium salicylate, tetrabutylammonium 2,3,5-trichlorobenzoate, potassium pentachlorophenolate, tetraethylammonium benzoate) in a tertiary alcohol solvent and (3) at least 0.01 M hydrogen peroxide (preferably at least 0.07 M hydrogen peroxide) and at least 0.01 M (preferably at least 0.05 M) tetraalkylammonium perchlorate (such as tetrabutylammonium perchlorate), and a solvent selected from the group comprising a tertiary alcohol and an ester such as dimethyl phthalate, ethyl benzoate, butyl benzoate, ethyl acetate, butyl acetate, triacetin.

Other oxalic esters which could be used satisfactorily in the place of bis(2,4,6-trichlorophenyl) oxalate include (a) bis(trichlorophenyl) oxalates, bis(tetrachlorophenyl) oxalates, bis(pentachlorophenyl)oxalates; (b) trichlorophenyl oxalates and tetrachlorophenyl oxalates where the phenyl group is substituted further by groups such as alkyl group (e.g., -n-octyl, -t-butyl, -methyl), haloalkyl group (e.g., -trifluoromethyl, -trichloromethyl), bromo substituents and cyano groups; (c) haloalkylphenyl oxalates (e.g., bis(ditrifluoromethylphenyl) oxalate).

Other tetraalkylammonium salt catalysts which could be used satisfactorily in the place of tetrabutylammonium perchlorate include tetrabutylammonium tetrafluoroborate, tetrabutylammonium hexafluorophosphate, tetraoctylammonium perchlorate benzyltrimethylammonium perchlorate and tetraethylammonium perchlorate.

Other alcohols which could be used satisfactorily in the place of 3-methyl-3-pentanol include 2-ethyl-2-hexanol, 1-methyl - 1 - cyclohexanol, 2-methyl-2-butanol, 2-ethyl-2-butanol, 2-methyl-2-pentanol, 2-methyl-2-hexanol, 2-methyl - 2 - heptanol, 2-ethyl-2-octanol and any mixture of them.

In the present invention, it has been found that a greatly superior chemiluminescent system for providing high intensity illumination over a relatively short time may be had by the use of basic salt type catalysts. Such a system provides the maximum obtainable illumination from the oxalate ester chemiluminescent system for a period of one-half to 3 hours or more, depending on the oxalate ester. The illumination intensity will vary with the specific oxalate ester compound used in the reaction. However, intensity obtained over the desired relatively short life span is brought to the maximum by the use of the basic salt type catalysts.

In order to better understand the effect of the basic salt type catalysts, the action of various types of catalysts on oxalate ester chemiluminescence will be discussed.

THE EFFECTS OF CATALYSTS ON THE CHEMILUMINESCENCE FROM OXALIC ESTERS, 9,10-BIS(PHENYLETHYNYL)ANTHRACENE (BPEA) AND HYDROGEN PEROXIDE

The two-component TCPO-BPEA-hydrogen peroxide system produces a high quantum yield of long-lived chemiluminescent light. However, a catalyst is needed to accelerate the reaction sufficiently for short and medium lifetime applications as well as to achieve an optimum intensity-lifetime performance for all applications. Therefore, the effect of selected catalysts was determined on the system which contained TCPO and BPEA component in ethyl benzoate and the hydrogen peroxide catalyst component in 3-methyl-3-pentanol solvent. Our analysis of the intensity-lifetime performance is greatly assisted by the calculation of "characteristic performance values" defined and described in the following section.

In practical terms the light output performance of a chemiluminescent system is determined by the absolute values of its intensity-time distribution. Thus, many practical applications will require a specific minimum intensity delivered over a specific minimum lifetime; usually a superior chemiluminescent system could be defined as one that provides either the highest intensity over a required lifetime or as one that provides a required intensity over the longest lifetime. The practical intensity-lifetime performance of a reaction is determined by both the total integrated light capacity and the shape of the intensity-decay curve. This can be seen conveniently by comparing FIGS. 1, 2 and 3.

Figure 1:
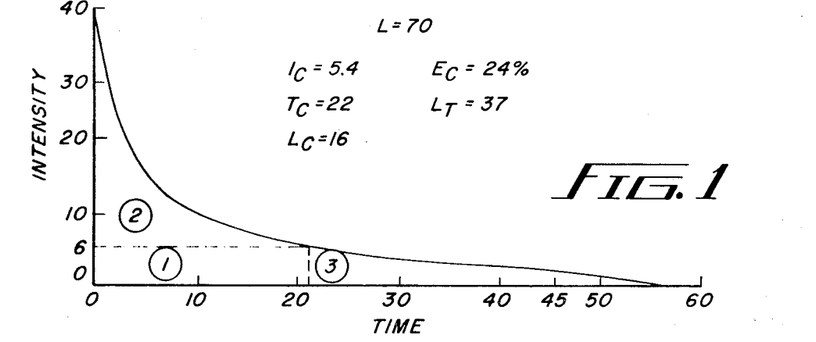

The figures represent intensity-time functions for three different systems all having a light capacity of 70 lumen hours liter$^{-1}$. Although the areas under the three curves are equal (the area is proportional to the light capacity) it is clear that the practical performance of the three systems varies markedly. FIG. 1 represents a typical system available at the start of this program; it is clear that for many applications, much of the light is wasted. If, for example a six lumen brightness is required, the useful lifetime of the system is only 22 minutes, and only the light capacity represented by the rectangular area 1 (16 lumen hours liter$^{-1}$) is actually pertinent; the excess intensity light (area 2) and the low intensity light (area 3) fall outside of the performance specifications. Thus, 54 lumen hours liter$^{-1}$ of light out of the available 70 lumen hours liter$^{-1}$ is wasted.

Figure 2:
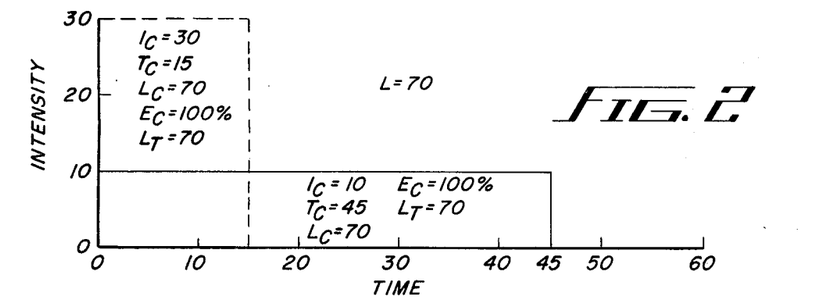
Figure 3:
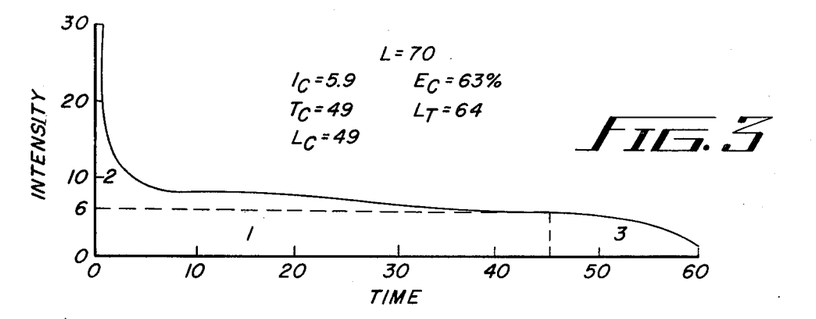

FIG. 2, in contrast, is an extreme case, all of the available light is emitted at a desired intensity, 30 foot-lamberts for 15 minutes (dashed line area) or 10 foot-lamberts for 45 minutes (solid line area) and the entire 70 lumen hours liter$^{-1}$ light capacity is pertinent to an application based on need for constant output. While it is unreasonable to expect the kinetics of a chemical reaction to provide the decay curve of FIG. 2, curve shapes which most closely approach it are desired. An intensity time distribution which approaches this goal is shown in FIG. 3. The superiority of curve 3 to curve 1 is clear even though both reactions produce the same total amount of light, curve 3 provides an intensity of 6 foot-lamberts over a lifetime twice as long as curve 1, and 63% of the available light (49 lumen hours liter$^{-1}$) is within the pertinent rectangle.

It appears from a comparison of curves 1-3 that the ratio of the maximum rectangular area to the total decay area is a useful criterion for efficient curve shape. Moreover, the values of intensity and time that maximize this ratio for a given reaction should be indicative of (although not strictly equivalent to) the most useful intensity and lifetime ranges for many practical applications. A computer program has therefore been written for the automatic determination of these "characteristic performance values": $I_c$, the intensity for which the ratio of the rectangular intensity-time area (area 1 in FIG. 3) to the total intensity-time area is maximized $T_c$, the time during which the intensity is above $I_c$; and $E_c$, the ratio of the maximum rectangular intensity time area to the total area. Since the absolute value of the light capacity is also a critical performance factor, the computer program also provides: $L_c$, the absolute light capacity (in lumen hours liter$^{-1}$) represented by the maximum rectangular intensity-time area; and $L_t$, the absolute light capacity of the reaction up to time $T_c$ (area 1 and area 2 in FIG. 3).

For some early experiments characteristic performance values were not calculated. However, it is possible to obtain an estimate of $E_c$ by comparing $t_{1/4}$ and $t_{3/4}$ lifetimes computed for these experiments. The $t_{1/4}$ lifetime represents the light intensity decay time from the maximum to one quarter intensity and the $t_{3/4}$ lifetime represents the time required for the emission of 75% of the available light. In general, the larger the $t_{1/4}:t_{3/4}$ ratio, the larger the $E_c$ value. A $t_{1/4}:t_{3/4}$ ratio of 0.8–1.0 represents an exceptionally efficient system ($E \simeq 0.5$–0.6).

It should be emphasized that a given formulation may be useful well outside its characteristic intensity and time values and that the selection of a formulation for a specific application is best done by matching the performance requirements of the application with the actual intensity-time plot. The characteristic performance values, are primarily helpful in determining the effects of reaction condition variations on the practical performance criteria and thus serve as a guide for system improvement. It should also be apparent that not all applications regard constant light output as the most efficient use of light capacity. It is well known that a higher intensity may be required to attract an observer's attention than will be required to retain his attention. If the ability to attract attention at time zero and then hold attention is the prime requirement, then an initial high intensity peak is desired and area 2 in FIG. 1 is not wasted but may be required. Still other curves can also be visualized.

(A) The effect of catalysts on the TCPO reaction

The effect of selected catalysts on the model TCPO reaction is summarized below. The results indicate that weak bases such as sodium salicylate are the most suitable catalysts for a short-lived 10–30 minute system, tetrabutyl ammonium perchlorate (TBAP) is superior for a 30–120 minute system.

(1) Basic catalysts.—In general, bases with conjugate acids having log pKa values between about 2 and 5 appear most satisfactory. Stronger bases give inefficient intensity-time distributions and weaker bases are only weakly active at best. For bases within the optimum basicity range, an optimum concentration range is found; at base concentrations below the optimum, decay curve shapes are inefficient and at higher concentrations light capacities decrease excessively. Thus, for TCPO, BPEA systems in ethyl benzoate-alcohol solvent mixtures, the optimum concentrations for sodium salicylate, tetrabutylammonium salicylate, and tetraethylammonium benzoate were found respectively to be in the ranges: 0:0005–0.0015 M, 0.0001–0.0008 M and 0.0005–0.001 M. Within these optimum concentration ranges, increasing base increased intensities and decreased lifetimes permitting the selection of practical operating lifetimes between about 10 minutes and two hours.

Tetrabutylammonium and sodium salicylates provide approximately equivalent results in 75% ethylbenzoate-alcohol. Sodium salicylate, however, is appreciably less effective in 75% dichlorobenzene-alcohol, perhaps reflecting more ion pairing in the less polar dichlorobenzene solvent.

Salicylic acid added to sodium or tetrabutylammonium salicylate reactions to give buffering action tends to counteract the effect of the base as expected, providing decreased intensity and increased lifetimes. Salicylic acid tends to decrease the curve shape efficiencies of tetrabutylammonium salicylate systems. It appears that combinations of salicylate salt and salicylic acid in suitable concentrations can almost duplicate the effect of a lower salicylate concentration alone. Although such buffering action does not provide superior operating performance, buffers may be useful in further improving storage stability by reducing the importance of adventitious acidic or basic impurities or those formed in decomposition reactions.

Tetrabutylammonium perchloroate (TBAP) added to a system catalyzed by low concentration of sodium salicylate increases the intensity but not the quantum yield. In systems catalyzed by high concentration of sodium salicylate, TBAP still increased the intensity but decreased light capacity and curve shape efficiency. This is in direct contrast to its effect when used alone (see below). Triphenylphosphine oxide has little effect on salicylate-catalyzed systems.

The hydrogen peroxide concentration has a very minor effect on lifetimes and light capacities in the 0.03 M–0.45 M concentration range with sodium salicylate-catalyzed 0.03 M TCPO systems. The curve shape efficiency, however, decreases with increasing hydrogen peroxide above about 0.075 M. The absence of an appreciable hydrogen peroxide concentration effect on the reaction rate suggests that hydrogen peroxide is not involved in a rate determining step of the reaction. This is also true for related oxalyl chloride and bis(2,4-dinitrophenyl)oxalate chemiluminescent reactions, but was not expected for the less reactive TCPO system.

(2) Tetrabutylammonium perchlorate (TBAP) catalyzed systems.—The addition of TBAP substantially increases the quantum yield and light capacity of the TCPO system. This effect of TBAP becomes the more pronounced the higher the TCPO concentration. At $3 \times 10^{-2}$ MTCPO concentration, TBAP increases the quantum yield and thus the light capacity by 36% and at $3.6 \times 10^{-2}$ M concentration by 50%. The intensities and curve shape efficiencies are similarly increased. The use of high TCPO concentration is desirable since the light capacity is proportional to the quantum yield as well as the TCPO concentration. TBAP is a superior catalyst for 30–120 minute lifetime systems.

(3) Other selected catalysts.—Increasing alcohol concentration in uncatalyzed TCPO-ethyl benzoate systems produces no substantial effect on light capacity. Unexpectedly, the reaction is slower with 25% 3-methyl-3-pentanol than with 10% 3-methyl-3-pentanol. Although the curve shape is relatively inefficient, the uncatalyzed 25% alcohol system appears useful for long-lived systems. In the absence of added basic catalysts, increased hydrogen peroxide concentration in the 75% ethyl benzoate-25% 3-methyl-3-pentanol system increases the intensity and shortens the lifetime. A hydrogen peroxide concentration near 0.033 M gives the higher light capacity. Acetanilide, salicylic acid, and triphenylphosphine oxide decrease the lifetime of the uncatalyzed alcohol system but do not appear to give substantially superior performance to the alcohol system alone. Cesium and rubidium chlorides, although essentially insoluble in 70% ethyl benzoate-25% 3-methyl-3-pentanol, are effective catalysts in stored systems.

(4) Solvent effects.—The sodium salicylate catalyzed TCPO reaction in ethyl benzoate produces equally good chemiluminescence in the presence of the following alcohol cosolvents: 3-methyl-3-pentanol, t-butanol, 2-ethylhexanol-2, 3,6-dimethyloctanol-3 and 2-octanol. Lower light capacities are obtained in the presence of 1,2-propanediol cosolvent.

The effect of several catalysts on the TCPO reaction was examined in ethyl benzoate-2-octanol solution. Salicylic acid-tetrabutylammonium hydroxide buffers alone and with TBAP cocatalyst produced high light capacities and good curve shape efficiencies. The strongly basic salt, rubidium acetate also produced high light capacities but poor curve shape efficiencies. Several poorly soluble salts suspended in the chemiluminescent solution by vigorous stirring produced surprisingly high light capacities and good curve shape efficiencies. Such salts are potassium formate, rubidium chloride, and sodium tetrahydroxysuccinate when used together with cocatalyst manmose. Sodium tetrahydroxysuccinate alone, as well as rubidium salicylate, produced high light capacities but led to poor shape efficienices.

Several catalysts were also tested in ethyl benzoate-t-butanol solution. The addition of potassium and benzyltrimethylammonium salts of 2,3,6-trichlorobenzoic acid led to high light capacity but to only moderately good curve shape efficiency. Two buffers 2,3,6-trichlorobenzoic acid-benzyltrimethylammonium hydroxide and tartaric acid-tetrabutylammonium hydroxide produced moderately high light capacities and moderately good curve shape efficiencies. The third buffer, phosphoric acid-benzyltrimethylammonium hydroxide, produced significantly higher light capacities and better curve shape efficiencies than the other two buffers but offered no advantage over the sodium salicylate catalyst. In a o-dichlorobenzene-t-butanol solution the sodium salicylate catalyst as well as the strong base benzyltrimethylammonium hydroxide leads to low light capacities and generally poor curve shape efficiencies.

(B) The effect of catalysts on the PCPO reaction

The effect of several catalysts was also examined on the bis(pentachlorophenyl)oxalate (PCPO) reaction in an ethyl benzoate-o-dichlorobenzene solution. The solubility of PCPO is substantially lower than that of TCPO in most solvents, limiting the light capacity of a PCPO system. The catalyst study experiments were carried out at $1 \times 10^{-2}$ M PCPO concentration, one third of that normally used for TCPO experiments. The catalytic effects were very similar to those observed in connection with the TCPO reaction. Strong bases produced moderately high quantum yields and short lifetimes. The addition of tetrabutylammonium perchlorate (TBAP) resulted in very high quantum yields, good curve shape efficiencies and moderately long (90 minutes) lifetimes. Triphenylphosphine oxide produced an effect similar to that of TBAP but it lead to a long lifetime. Poorly soluble alkali metal salts produced high quantum yields and short or medium lifetime depending on the salt. Another poorly soluble salt, sodium tetrahydroxysuccinate, alone or with dulcitol cocatalyst, gave moderate quantum yields and short lifetimes.

EXAMPLE I

Absolute quantum yields, light capacities, lifetimes and characteristic performance values of the bis(2,4,6-trichlorophenyl) oxalate (TCPO)-hydrogen peroxide-9,10-bis-(phenylethynyl)anthracene (BPEA) chemiluminescent reactions were measured by using instrumentation and experimental techniques described below.[1] The effect of varying concentration of sodium salicylate catalyst was examined and the results are collected in Table I. Sodium salicylate increases the brightness and improves the curve shape efficiency of the uncatalyzed reaction substantially. The optimum catalyst concentration lies near $1 \times 10^{-3}$ M sodium salicylate, which produces at least 5.5–6.0 foot lambert intensity for 43 minutes. The intensity can be increased further by the use of higher catalyst concentration. However, at those concentrations substantially lower light capacities and lifetimes are obtained.

EXAMPLE II

The effect of tetrabutylammonium salicylate (TBAS) on the uncatalyzed reaction is measured in two different solvent mixtures (75% ethylbenzoate-25% 3-methyl-3-pentanol and 75% o-dichlorobenzene-3-methyl-3-pentanol) by the experimental method described in Example I. The results are collected in Table II. In ethylbenzoate-3-methyl-3-pentanol solvent a very small $1 \times 10^{-4}$ M concentration of TBAS produced a larger (65%) increase in light capacity but no substantial improvement of curve efficiency or lifetime. However, increasing TBAS concentration substantially increased the intensity, curve shape efficiency, decreased the lifetime and brought down the light capacity to the level of the uncatalyzed reaction. There is an optimum TBAS concentration range ($0.5 \times 10^{-3}$–$1.0 \times 10^{-3}$ M). At TBAS concentrations higher than this range the light capacity decreases substantially to below the level of the uncatalyzed reaction. In o-dichlorobenzene-3-methyl-3-pentanol solvent TBAS produces a strong catalytic effect similar to that in ethyl benzoate-3-methyl-3-pentanol. The optimum catalyst concentration is approximately $1 \times 10^{-3}$ M TBAS.

---

[1] B. G. Roberts and R. C. Hirt, Applied Spect., 21, 250 (1967).

TABLE I.—THE EFFECT OF SODIUM SALICYLATE CONCENTRATION ON 0.03 M TCPO CHEMILUMINESCENCE IN ETHYL BENZOATE-3-METHYL-3-PENTANOL [a]

| Sodium salicylate ($10^3 \times$ M) | $I_{max}$[b] (ft. L. cm.$^{-1}$) | $t_{1/2}$[c] (min.) | $t_{3/4}$[d] (min.) | Q.Y.[e] ($10^2$ E. mole$^{-1}$) | Lt. cap. (lm. hr. l.$^{-1}$) | $I_o$ (ft. L. cm.$^{-1}$) | $T_o$ (min.) | $T_1$ (min.) | E (percent) | $LC_o$ (lm. hr. l.$^{-1}$) | $LC_t$ (lm. hr. l.$^{-1}$) |
|---|---|---|---|---|---|---|---|---|---|---|---|
| None | 6 | 99 | 198 | 8.8 | 81 | 0.7 | 219 | 0.4 | 30 | 24 | 63 |
| 0.10 | 9 | 71 | 117 | 8.8 | 80 | 2.0 | 80 | 0 | 31 | 25 | 51 |
| 0.50 | 15 | 49 | 48 | 8.3 | 75 | 3.9 | 56 | 0 | 45 | 34 | 61 |
| 1.00 | 28 | 16 | 37 | 7.6 | 69 | 5.5 | 43 | 0 | 54 | 37 | 57 |
| 1.25 [g] | 42 | 4.0 | 40 | 8.3 | 77 | 6.2 | 50 | 0 | 64 | 49 | 68 |
| 3.00 | 45 | 4.4 | 16 | 4.9 | 44 | 8.3 | 18 | 0 | 51 | 22 | 34 |

[a] Reactions of 0.030 M TCPO, 0.075 M $H_2O_2$ and 0.002 M BPEA in 80 vol. percent ethyl benzoate-20 vol. percent 3-methyl-3-pentanol at 25° C.
[b] Maximum intensity.
[c] Light decay time from maximum to $\frac{1}{2}$ of maximum intensity.
[d] Time required for the emission of 75% of the total light.
[e] Quantum yield based on TCPO.
[f] See text.
[g] 75 vol. percent ethyl benzoate-25 vol. percent 3-methyl-3-pentanol.

TABLE II.—THE EFFECT OF TETRABUTYLAMMONIUM SALICYLATE ON THE 0.03 M TCPO CHEMILUMINESCENCE IN ETHYL BENZOATE[a] AND DICHLOROBENZENE

| Bu$_4$N salicylate ($10^4$ M) | $I_{max}$[b] (ft. L. cm.$^{-1}$) | $t_{1/2}$[c] (min.) | $t_{3/4}$[d] (min.) | Q.Y.[e] ($10^2$ E. mole$^{-1}$) | Lt. cap. (lm. hr. l.$^{-1}$) | $I_o$ (ft. cm.$^{-1}$) | $T_o$ (min.) | $T_1$ (min.) | E (percent) | $LC_o$ (lm. hr. l.$^{-1}$) | $LC_t$ (lm. hr. l.$^{-1}$) |
|---|---|---|---|---|---|---|---|---|---|---|---|
| A. In ethyl benzoates-3-methyl-3-pentanol (75-25% vol.) solvent | | | | | | | | | | | |
| None | 6.0 | 99 | 198 | 8.8 | 81 | 0.7 | 219 | 0.4 | 30 | 24 | 63 |
| 1.0 | 25 | 32 | 106 | 14.4 | 134 | 2.8 | 96 | 0 | 29 | 39 | 90 |
| 5.0 | 55 | 14 | 25 | 9.9 | 84 | 9.9 | 26 | 0 | 47 | 39 | 63 |
| 7.5 | 53 | 7.8 | 24 | 7.5 | 69 | 8.1 | 27 | 0 | 50 | 35 | 56 |
| 10.0 | 51 | 12 | 16 | 6.0 | 56 | 11.0 | 15 | 0 | 46 | 26 | 41 |
| 10.0 | 44 | 16 | 17 | 5.3 | 50 | 10.2 | 17 | 0 | 56 | 28 | 37 |
| B. In o-dichlorobenzene-3-methyl-3-pentanol (75-25% vol.) solvent | | | | | | | | | | | |
| None | | | | | | Too dim to measure | | | | | |
| 10.0 | 44 | 6.9 | 37 | 7.6 | 69 | 3.4 | 44 | 0 | 34 | 24 | 53 |
| 10.0 | 44 | 6.4 | 37 | 7.3 | 66 | 3.3 | 43 | 0 | 33 | 22 | 50 |
| 25.0 | 51 | 3.3 | 17 | 4.0 | 37 | 4.7 | 19 | 0 | 37 | 14 | 29 |
| 50.0 | 28 | 2.5 | 9.7 | 1.6 | 14 | | | Not submitted | | | |
| 75.0 | 24 | 1.3 | 3.4 | 0.6 | 5.3 | | | Not submitted | | | |

[a] Reactions of .03 M TCPO, .003 M BPEA and .075 M hydrogen peroxide at 25° C.
[b] Maximum intensity.
[c] Light decay time from maximum to $\frac{1}{2}$ of maximum intensity.
[d] Time required for the emission of 75% of the total light.
[e] Quantum yield based on TCPO.

EXAMPLE III

The effect of tetraethylammonium benzoate (TEAB) on the uncatalyzed reaction is examined by the experimental method described in Example I. The results, collected in Table III indicate that TEAB substantially increases the intensity and curve shape efficiency of the uncatalyzed reaction. There is an optimum range of catalyst concentration of $0.5 \times 10^{-3} - 1 \times 10^{-3}$ M TEAB. At concentrations higher than that the light capacity decreases rapidly

EXAMPLE IV

The effect of various additives on the uncatalyzed TCPO reaction is shown in Table IV. The following additives produced no substantial effect: Polyvinylpyrrolidone Tetradecyl Sodium Sulfate, Cabosil M-5 (Cabot Co.), Amberlite CG 400 ion exchange resin. Other additives decreased the light capacity moderately such as: Alumina, and Surfactants. HDN®, Avitex® NA (DuPont Co.).

EXAMPLE V

The effect of sodium tetrahydroxysuccinate and mannose on the uncatalyzed TCPO reaction on ethyl benzoate-2-octanol solution is shown in Table V. The poorly soluble additives suspended in the chemiluminescent solution catalyze the reaction and produce a high light capacity (80-88 lum. hr. l.$^{-1}$). Sodium tetrahydroxysuccinate is soluble in the solvent mixture of ethyl benzoate-2-octanol-1,2-propanediol (84-88%) and catalyzes the reaction and produces a moderately high 50 lum. hr. l.$^{-1}$ light capacity.

TABLE III.—THE EFFECT OF TETRAETHYLAMMONIUM BENZOATE ON 0.03 M TCPO CHEMILUMINESCENCE IN ETHYL BENZOATE-3-METHYL-3-PENTANOL [a]

| (Et)$_4$N benzoate (10$^3$ M) | $I_{max}$[b] (ft. L. cm.$^{-1}$) | $t\frac{1}{4}$[c] (min.) | $t\frac{3}{4}$[d] (min.) | Q.Y.[e] (10$^2$ E. mole$^{-1}$) | Lt. cap. (lm. hr. l$^{-1}$) | $I_o$ (ft. L. cm.$^{-1}$) | $T_o$ (min.) | $T_i$ (min.) | E (percent) | LC$_o$ (lm. hr. l.$^{-1}$) | LC$_t$ (lm) hr. l$^{-1}$. |
|---|---|---|---|---|---|---|---|---|---|---|---|
| None | 6.0 | 99 | 198 | 8.8 | 81 | 0.7 | 219 | 0.4 | 30 | 24 | 63 |
| 0.5 | 44 | 11 | 41 | 10.0 | 93 | 5.5 | 52 | 0 | 48 | 44 | 78 |
| 0.75 | 51 | 10 | 30 | 9.0 | 84 | 7.1 | 38 | 0 | 50 | 42 | 71 |
| 1.0 | 51 | 17 | 19 | 7.7 | 72 | 10.9 | 21 | 0 | 50 | 36 | 57 |
| 2.5 | 36 | 11 | 9 | 4.0 | 35 | | Not determined | | | | |

[a] Reactions of .03 M TCPO, .003 M BPEA, and 0.75 M H$_2$O$_2$ in ethyl benzoate-3-methyl-3-pentanol (75-25% vol.) at 25° C.
[b] Maximum intensity.
[c] Light decay time from maximum to ¼ of maximum intensity.
[d] Time required for the emission of 75% of the total light.
[e] Quantum yield based on TCPO.

TABLE IV.—ADDITIVE EFFECTS ON THE TCPO REACTION [a]

| Experiment No. | Additive (M) | $t\frac{3}{4}$[b] (min.) | Q.Y.[c] (10$^2$ E. mole$^{-1}$) | L.C.[e] (lm. hr. l.$^{-1}$) | $I_o$ (ft. L. cm.$^{-1}$) | $T_o$ (min.) | $T_i$ (min.) | E (percent) | LC$_o$ (lm. hr. l.$^{-1}$) | LC$_T$ (lm. hr. l.$^{-1}$) |
|---|---|---|---|---|---|---|---|---|---|---|
| 1 | None | 197.9 | 8.8 | 80.6 | 0.7 | 219.3 | 0.4 | 30 | 23.9 | 62.5 |
| 2 | Polyvinylpyrrolidone (50 mg./3 ml.)[d] | 156.2 | 8.6 | 79.0 | 1.3 | 108.3 | 0.3 | 26 | 20.9 | 51.3 |
| 3 | Tetradecyl sodium sulfate (50 mg./3 ml.)[d] | 244.4 | 8.2 | 74.9 | 0.8 | 193.3 | 2.0 | 33 | 24.4 | 50.6 |
| 4 | Amberlite CG 400 (50 mg./3 ml.)[d] | 280.0 | 7.7 | 70.4 | 0.5 | 258.8 | 0 | 27 | 18.9 | 51.3 |
| 5 | Cabosil (50 mg./3 ml.)[d] | 353.0 | 8.1 | 74.5 | 1.0 | 144.2 | 11.3 | 30 | 22.6 | 37.1 |
| 6 | Alumina (Al$_2$O$_3$) (50 mg./3 ml.)[d] | 70.1 | 3.3 | 30.0 | 2.8 | 23.8 | 5.8 | 34 | 10.3 | 13.7 |
| 7 | Surfacant HDN ® (58 mg./3 ml.)[d] | 15.2 | 3.8 | 34.5 | 7.9 | 12.5 | 1.5 | 44 | 15.1 | 23.5 |
| 8 | Surfactant Avitex ® NA (48 mg./3 ml.)[d] | 153.1 | 5.8 | 53.3 | 1.2 | 86.2 | 0 | 30 | 15.8 | 53.3 |

[a] Reactions of 0.030 M TCPO with 0.075 M H$_2$O$_2$ and 3×10$^{-3}$ M BPEA in ethyl benzoate-3-methyl-3-pentanol (75-25% vol.) at 25° C.
[b] Time required for three-quarters of total light emission.
[c] Q.Y.=Quantum yield based on TCPO.
[d] Insoluble or partially soluble.
[e] L.C.=Light capacity.

NOTE.—R=DuPont Trademark.

TABLE V.—THE EFFECT OF SODIUM TETRAHYDROXYSUCCINATE AND MANNOSE ON THE TCPO CHEMILUMINESCENCE IN ETHYL BENZOATE-2-OCTANOL [a]

| Additive Type | Conc. (10$^2$×M) | Mg./3 ml. reaction mixture if partially soluble | $I_{max}$[b] (foot lamberts) | $t\frac{1}{4}$[c] (min.) | $t\frac{3}{4}$[d] (min.) | Quantum yield (10$^2$ einsteins mole$^{-1}$) | Light capacity (lumen hours liter$^{-1}$) |
|---|---|---|---|---|---|---|---|
| None | | | 1.4 | 175 | 347 | 5.1 | 46.5 |
| (C(OH)$_2$CO$_2$Na·H$_2$O)$_2$ [e] | 0.01 | | 16.27 | 6.9 | 101.8 | 5.5 | 48.3 |
| (C(OH)$_2$CO$_2$Na·H$_2$O)$_2$ [e] | 0.02 | | 47.04 | 2.8 | 67.7 | 5.9 | 51.9 |
| Rb salicylate | | 0.8 | 68.31 | 1.7 | 154.8 | 11.3 | 99.3 |
| (C(OH)$_2$CO$_2$Na·H$_2$O)$_2$ Mannose | | 39.3 / 10.8 | 27.3 | 35.5 | 26.4 | 9.0 | 79.1 |
| (C(OH)$_2$CO$_2$Na·H$_2$O)$_2$ Mannose | | 7.86 / 5.4 | 7.1 | 81.5 | 219.4 | 10.1 | 88.8 |

[a] Reaction concentrations were: 3×10$^{-2}$ M TCPO, 3×10$^{-3}$ M BPEA and 7.5×10$^{-2}$ M H$_2$O$_2$ in ethylbenzoate 2-octanol (92-8% by volume) at 25° C.
[b] Maximum intensity at 1.0 cm. thickness.
[c] Light decay time from maximum to ¼ of maximum intensity.
[d] Time required for the emission of 75% of the total light.
[e] Solvent was ethylbenzoate-2-octanol-1,2-propanediol (84-8-8% by volume).

EXAMPLE VI

The effect of 2,3,6 - trichlorobenzoate salts on the TCPO reaction in ethyl benzoate-t-butanol (90–10%) solution is compared in Table VI. The addition of benzyltrimethylammonium salt produces slightly lower light capacities and shorter lifetimes than obtained with the sodium salt. However, the curve shape efficiency of the reaction appears to be superior as indicated by the smaller difference in $t_{1/4}$ and $t_{3/4}$ lifetimes. Sodium trichlorobenzoate produces high light capacities which decrease with increasing catalyst concentration.

EXAMPLE VII

The effect of sodium salicylate on the TCPO reaction in various solvent mixtures is shown by Table VII. The results indicate that sodium salicylate in an ethyl benzoate-alcohol solution produces a higher light capacity, higher light intensity and better curve shape efficiency (based on $t_{1/4}:t_{3/4}$ ratio) than in o-dichlorobenzene -t-butanol solution. Approximately similar results are obtained in ethyl benzoate-2-octanol and ethyl benzoate-t-butanol solutions. However, substantially lower light capacities are obtained in ethyl benzoate-1,2-propanediol solution. The addition of water leaves the light capacity essentially unchanged in ethyl benzoate-t-butanol solution.

EXAMPLE VIII

The effect of benzyltrimethylammonium hydroxide concentration on the TCPO reaction in o-dichlorobenzene-t-butanol (90–10%) solution is shown in Table VIII. The benzyltrimethylammonium hydroxide (Triton B) catalyzed reaction produces a moderately high light capacity and poor curve shape efficiency.

TABLE VI.—THE EFFECT OF 2,3,6-TRICHLOROBENZOATE SALTS ON TCPO CHEMILUMINESCENCE IN ETHYL BENZOATE-t-BUTANOL SOLUTION [a]

|  | $I_{max.}$[b] (foot lamberts) | $t\,1/4$[c] (min.) | $t\,3/4$[d] (min.) | Quantum yield ($10^2\times$einsteins mole$^{-1}$) | Light capacity (lumen hours liter$^{+1}$) |
|---|---|---|---|---|---|
| Benzyltrimethylammonium salt: | | | | | |
| $1.5\times10^{-3}$ M[e] | 33.0 | 14.5 | 32.0 | 7.8 | 68 |
| $1.5\times10^{-3}$ M[f] | 24.7 | 16.1 | 42.2 | 7.5 | 65 |
| Potassium salt: | | | | | |
| $1.5\times10^{-3}$ M | 24.7 | 10.2 | 124 | 10.4 | 90 |
| $3\times10^{-3}$ M | 33.0 | 3.0 | 78 | 7.4 | 64 |
| $4.5\times10^{-3}$ M | 27.5 | 6.8 | 45 | 5.1 | 44 |
| $1.5\times10^{-3}$ M[g] | 22.0 | 2.7 | 88.4 | 3.0 | 26 |
| $3.0\times10^{-3}$ M[g] | 26.4 | 3.9 | 84.3 | 3.5 | 30 |

[a] Reaction concentrations were: $3\times10^{-2}$ M TCPO, $3\times10^{-3}$ M BPEA and $7.5\times10^{-2}$ M $H_2O_2$ in ethylbenzoate t-butanol (90-10% by volume) at 25° C.
[b] Maximum intensity at 1.0 cm. thickness.
[c] Light decay time from maximum to 1/4 of maximum intensity.
[d] Time required for the emission of 75% of the total light.
[e] Solid only slightly soluble in t-butanol.
[f] 0.28 M $H_2O$ added with the $H_2O_2$ sol.
[g] The solvent for these experiments was 90% o-dichlorobenzene and 10% t-butanol.

TABLE VII.—EFFECT OF SODIUM SALICYLATE ON TCPO CHEMILUMINESCENCE IN VARIOUS SOLVENT MIXTURES [a]

| Na salicylate ($M\times10^3$) | Solvent | | | $I_{max.}$[b] (ft. L.) | $t\,1/4$[c] (min.) | $t\,3/4$[d] (min.) | Quantum yield (einsteins mole$^{-1}$ $\times10^2$) | Light capacity (lumen hours liter$^{-1}$) |
|---|---|---|---|---|---|---|---|---|
| | [t-Butanol (percent vol.) | [o-Dichlorobenzene (percent vol.) | [1,2-propane-diol (percent vol.) | | | | | |
| 1.0[e] | 10 | | | 24.7 | 9 | 179 | 11.62 | 101 |
| 1.25 | [f] 10 | | | 45.6 | 21 | 16 | 8.9 | 78.1 |
| 1.5 | 10 | | | 21.9 | 31 | 28 | 6.54 | 57 |
| 3.0 | 10 | | | 38.5 | 9 | 18 | 5.49 | 48 |
| 4.0[e] | 3 | | 7 | 34.1 | 13 | 19 | 5.37 | 47 |
| 1.5[g] | 10 | | | 27.5 | 14 | 31 | 6.32 | 55 |
| 1.5[h] | 10 | | | 22.0 | 3 | 108 | 5.59 | 49 |
| 1.5[i] | 10 | | | 33.0 | 12 | 33 | 7.57 | 66 |
| 1.0[e] | | | 10 | 35.7 | 5 | 88 | 7.09 | 61 |
| 1.0[e] | 8.3 | | 1.7 | 22.0 | 16 | 125 | 10.47 | 91 |
| 0.75 | 10 | 90 | | 13.7 | 6 | 67 | 3.07 | 27 |
| 1.5 | 10 | 90 | | 19.2 | 4 | 61 | 3.28 | 28 |

[a] Reaction concentrations were: $3\times10^{-2}$ M TCPO, $3\times10^{-3}$ M BPEA and $7.5\times10^{-2}$ M $H_2O_2$ in 90% ethylbenzoate solvent mixtures as indicated.
[b] Maximum intensity at 1.0 cm. thickness.
[c] Light decay time from maximum to 1/4 of maximum intensity.
[d] Time required for the emission of 75% of the total light.
[e] 0.1 M $H_2O_2$ was used.
[f] 2-octanol was used in the place of t-butanol.
[g] $[H_2O]=0.28$ M, added with $H_2O_2$ sol.
[h] $[H_2O]=0.28$ M, injected as pure $H_2O$.
[i] $[H_2O]=0.14$ M, added with $H_2O_2$ sol.

TABLE VIII.—THE EFFECT OF TRITON B ON THE TCPO CHEMILUMINESCENCE IN o-DICHLOROBENZENE-t-BUTANOL SOLUTION [a]

| Additive | | $I_{max.}$[b] (foot lamberts) | $t\,1/4$[c] (min.) | $t\,3/4$[d] (min.) | Quantum yield ($10^2\times$ einsteins mole$^{-1}$) | Light capacity (lumen hours liter$^{-1}$) |
|---|---|---|---|---|---|---|
| Type | Conc. ($10^2\times$M) | | | | | |
| Triton B | 0.01 | 13.13 | 10.7 | 128.2 | 5.5 | 48.3 |
| Do | 0.02 | 22.54 | 5.7 | 85.7 | 5.6 | 49.2 |

[a] Reaction concentrations were $3\times10^{-2}$ M TCPO, $3\times10^{-3}$ M BPEA and $7.5\times10^{-2}$ M $H_2O_2$ in o-dichlorobenzene-t-butanol (90–10% by volume) at 25° C.
[b] Maximum intensity at 1.0 cm. thickness.
[c] Light decay time from maximum to 1/4 of maximum intensity.
[d] Time required for the emission of 75% of the total light.

Increasing the catalyst concentration decreases the lifetime but leaves light capacity and curve shape efficiency (based on $t_{1/4}:t_{3/4}$ ratio) essentially unchanged.

EXAMPLE IX

The effect of basic catalysts on the PCPO reaction in ethyl benzoate-o-dichlorobenzene solution is shown in Table IX. Both tetrabutylammonium and potassium phenolate basic salts increased the light capacity and intensity and decreased lifetime substantially. However, the tetrabutylammonium salt produced a significantly higher light capacity than potassium pentachlorophenolate. The addition of acetanilide increased the light capacity substantially and the lifetime slightly.

EXAMPLE X

The performance characteristics and representative intensity data of the TCPO reaction in the presence of various catalysts in various solvents are collected in Table X. Table Xa shows the chemiluminescence data and Table Xb shows the reaction conditions. The data are listed in the order of decreasing characteristic intensity. Experiments which produced a light capacity of less than 20 lumen hours l$^{-1}$ are eliminated as being obviously inferior.

All PCPO experiments are also excluded because the lower solubility of PCPO in most solvents leads to substantially lower light capacities than those available from the TCPO reaction at similar quantum yields.

The results in Table X indicate that the sodium salicylate catalyst in ethyl benzoate-2-octanol or in ethyl benzoate-3-methyl-3-pentanol solution produces a superior short-lived (up to 20 minutes) chemiluminescent reaction. (See Expt. 2). The light intensity, light capacity and curve shape efficiency all are the highest in the presence of sodium salcylate catalyst. The addition of Dacta as cocatalyst produces a slight increase of intensity but this effect disappears after a few days storage at room temperature. Good alternate choices to sodium salicylate are catalysts such as sodium tetrahydroxysuccinate with mannose, a heterogeneous catalyst combination (Expt. 5) and tetrabutylammonium salicylate with tetrabutylammonium perchlorate (Expt. 6) or alone (Expt. 8).

The results in Table X further indicate that the tetrabutylammonium perchlorate catalyzed reaction in ethyl benzoate-3-methyl-3-pentanol solution produces a superior medium length (up to 2 hrs.) chemiluminescent emission (see Expts. 14, 27, 29, 37, 48, 75 and 82).

Good alternate choices are tetrabutylammonium salicylate (Expts. 77, 70, 71, 51, 26 and 24) and sodium salicylate (Expts. 60, 54, 43, 40, 36, 34 and 33) catalysts. Tetrabutylammonium salicylate is an equally satisfactory catalyst in o-dichlorobenzene-3-methyl-3-pentanol solution (Expts. 51, 70 and 71).

The results in Table X also indicate that for lifetime longer than 2 hrs., the triphenylphosphine oxide, acetanilide catalyzed reaction, or the uncatalyzed reaction in ethyl benzoate-3-methyl-3-pentanol solution produce superior light emission (Expts. 96, 98 and 99).

EXAMPLE XI

The exceptionally high performance TCPO chemiluminescent systems are listed and compared in Table XI. The experiment number given refers to Table X.

EXAMPLE XII

An oxalate component was prepared by dissolving 0.004 mole of TCPO and 0.0004 mole of BPEA in 75 ml. of ethyl benzoate. A peroxide component was prepared by dissolving 0.03 mole of hydrogen peroxide in 25 ml. of dimethyl phthalate. These two components were admixed with a catalyst component comprising 0.00001 mole of tetrabutylammonium salicylate. Light was obtained which provided an intensity greater than 4 foot lamberts cm.$^{-1}$, during 30 minutes.

TABLE IX.—THE EFFECT OF BORIC SALT ON PCPO CHEMILUMINESCENCE IN ETHYL BENZOATE-o-DICHLOROBENZENE SOLUTION [a]

| Additive | | | | | Quantum yield ($10^2 \times$ einsteins mole$^{-1}$) | Light capacity (lumen hours liter$^{-1}$) |
| --- | --- | --- | --- | --- | --- | --- |
| Type | Concentration ($10^2 \times$ M) | $I_{max.}$[b] (foot lamberts) | $t\frac{1}{4}$[c] (min.) | $t\frac{3}{4}$[d] (min.) | | |
| None | | 0.21 | 216.3 | 484.9 | •2.6 | 6.7 |
| KOC$_6$Cl$_5$ | 0.01 | 63.68 | 2.5 | 2.4 | 7.8 | 20.0 |
| (C$_4$H$_9$)$_4$NOC$_6$Cl$_5$ | 0.01 | 66.45 | 2.8 | 3.1 | 9.4 | 24.0 |
| CH$_3$CONHC$_6$H$_5$ | 0.50 | 0.40 | 340.0 | 609.5 | 7.7 | 19.8 |

[a] Concentrations were 1×10$^{-2}$ M bis(pentachlorophenyl)oxalate (PCPO), 1×10$^{-3}$ M 9,10-bis(phenylethynyl)anthracene (BPEA) and 2×10$^{-2}$ M H$_2$O$_2$ in ethylbenzoate-o-dichlorobenzene (50-50% by volume) at 25° C.
[b] Maximum intensity at 1.0 cm. thickness.
[c] Light decay time from maximum to ¼ of maximum intensity.
[d] Time required for the emission of 75% of the total light.
[e] A fraction larger than 15% of the total quantum yield was estimated on the basis of extrapolation.

EXAMPLE XIII

The experiment of Example XII was repeated except that the catalyst component comprised a solution of 0.00001 mole of tetrabutylammonium salicylate in dimethyl phthalate. Again light in excess of 4 foot lamberts cm.$^{-1}$ was generated during 30 minutes.

TABLE Xa.—INTENSITY LIFETIME PERFORMANCE SUMMARY OF TCPO CHEMILUMINESCENCE

| | Characteristic performance values | | | | | | Intensities (ft. L. cm.c¹) at selected time (minutes)— | | | | | | |
|---|---|---|---|---|---|---|---|---|---|---|---|---|---|
| No. | $I_o$ (ft. L. cm.$^{-1}$) | $T_o$ (min.) | Tind. (min.) | E (percent) | $LC_o$ (lm. hr. l.$^1$) | LCt (lm. hr. l$^{-1}$) | 10 | 20 | 30 | 60 | 120 | 240 | 720 |
| 1 | 19.3 | 10 | 0 | 55 | 30 | 41 | 19.3 | | | | | | |
| 2 | 17.5 | 17 | 0 | 57 | 47 | 64 | 22.5 | 13.7 | 1.5 | | | | |
| 3 | 15.1 | 20 | 0 | 59 | 47 | 62 | 18.2 | 14.9 | 3.9 | | | | |
| 4 | 13.8 | 15 | 0 | 52 | 32 | 46 | 17.6 | 8.4 | 0.5 | | | | |
| 5 | 13.3 | 27 | 0 | 63 | 54 | 65 | 15.5 | 15.3 | 11.4 | | | | |
| 6 | 11.5 | 14 | 0 | 47 | 25 | 40 | 14.6 | 6.2 | | | | | |
| 7 | 11.2 | 19 | 0 | 48 | 31 | 47 | 15.4 | 10.4 | 4.1 | | | | |
| 8 | 11.0 | 15 | 0 | 46 | 26 | 41 | 14.4 | 7.3 | 1.8 | | | | |
| 9 | 10.9 | 21 | 0 | 50 | 36 | 57 | 15.8 | 11.4 | | | | | |
| 10 | 10.7 | 13 | 0 | 45 | 22 | 36 | 13.2 | 5.7 | 1.4 | | | | |
| 11 | 10.2 | 17 | 0 | 56 | 28 | 37 | 12.5 | 8.4 | 1.7 | | | | |
| 12 | 9.9 | 26 | 0 | 47 | 39 | 63 | 15.0 | 12.0 | 8.2 | .2 | | | |
| 13 | 9.7 | 18 | 0 | 48 | 28 | 44 | 13.0 | 8.8 | 3.1 | | | | |
| 14 | 9.6 | 46 | 0 | 56 | 70 | 93 | 15.0 | 12.8 | 12.1 | 6.3 | | | |
| 15 | 9.5 | 12 | 0 | 32 | 17 | 40 | 11.3 | 4.7 | 1.6 | | | | |
| 16 | 9.1 | 8.9 | 0 | 30 | 12 | 25 | 8.1 | 3.2 | 1.5 | | | | |
| 17 | 9.0 | 16 | 0 | 35 | 22 | 38 | 13.1 | 6.8 | 3.9 | .8 | | | |
| 18 | 8.9 | 27 | 0 | 48 | 37 | 57 | 13.6 | 11.0 | 7.8 | | | | |
| 19 | 8.6 | 9.6 | 0 | 31 | 12 | 25 | 8.2 | 3.1 | 1.7 | | | | |
| 20 | 8.5 | 23 | 0 | 48 | 30 | 50 | 12.5 | 9.5 | 5.2 | | | | |
| 21 | 8.3 | 18 | 0 | 51 | 22 | 34 | 10.8 | 7.0 | 1.6 | | | | |
| 22 | 8.3 | 22 | 0 | 37 | 28 | 54 | 14.3 | 8.9 | 5.8 | | | | |
| 23 | 8.2 | 28 | 0 | 46 | 35 | 57 | 13.1 | 10.5 | 7.6 | 1.0 | | | |
| 24 | 8.1 | 27 | 0 | 50 | 35 | 56 | 12.3 | 9.9 | 7.2 | | | | |
| 25 | 7.7 | 19 | 0 | 13 | 23 | 39 | 10.9 | 7.4 | 2.9 | | | | |
| 26 | 7.5 | 35 | 0 | 52 | 40 | 60 | 11.3 | 9.7 | 8.5 | | | | |
| 27 | 7.5 | 50 | 3.76 | 57 | 85 | 76 | 10.7 | 10.3 | 9 6 | 5.8 | | | |
| 28 | 7.4 | 20 | 0 | 45 | 23 | 39 | 10.7 | 7.4 | 3.2 | | | | |
| 29 | 7.4 | 48 | 1.32 | 49 | 56 | 82 | 13.2 | 11.3 | 99. | 5.5 | | | |
| 30 | 7.2 | 19 | 0 | 44 | 22 | 35 | 10.6 | 6.9 | 3.5 | | | | |
| 31 | 7.1 | 33 | 0 | 54 | 35 | 45 | 8.9 | 8.7 | 7.8 | 1.6 | | | |
| 32 | 7.1 | 38 | 0 | 50 | 42 | 71 | 12.7 | 9.8 | 8.3 | | | | |
| 33 | 6.8 | 22 | 0 | 34 | 23 | 47 | 12.0 | 7.4 | 4.7 | 1.3 | | | |
| 34 | 6.7 | 33 | 0 | 54 | 35 | 53 | 9.6 | 8.2 | 7.4 | | | | |
| 35 | 6.3 | 36 | 0 | 47 | 34 | 55 | 10.1 | 8.4 | 7.2 | 1.4 | | | |
| 36 | 6.2 | 50 | 0 | 64 | 49 | 68 | 9.2 | 7.6 | 7.1 | 2.6 | | | |
| 37 | 6.2 | 73 | 4.32 | 61 | 71 | 86 | 8.7 | 8.4 | 7.4 | 1.3 | | | |
| 38 | 6.1 | 12 | 0 | 30 | 11 | 24 | 7.4 | 3.3 | 1.4 | | | | |
| 39 | 5.9 | 34 | 0 | 41 | 31 | 56 | 10.9 | 8.1 | 6.6 | 1.5 | | | |
| 40 | 5.9 | 49 | 0 | 63 | 45 | 64 | 8.9 | 7.5 | 6.9 | 2.2 | | | |
| 41 | 5.8 | 46 | 0 | 59 | 42 | 62 | 9.2 | 7.4 | 6.8 | 1.2 | | | |
| 42 | 5.6 | 51 | 0 | 56 | 43 | 66 | 8.7 | 7.3 | 6.9 | 3.5 | | | |
| 43 | 5.5 | 43 | 0 | 54 | 37 | 57 | 9.3 | 7.5 | 6.7 | 1.7 | | | |
| 44 | 5.5 | 52 | 0 | 48 | 44 | 78 | 11.7 | 8.7 | 7.4 | 4.3 | | | |
| 45 | 5.4 | 22 | 0 | 24 | 16 | 37 | 10.5 | 5.9 | 3.8 | 1.4 | .8 | | |
| 46 | 5.4 | 33 | 0 | 42 | 25 | 42 | 8.7 | 7.0 | 5.8 | 1.6 | | | |
| 47 | 5.3 | 40 | 2.05 | 33 | 30 | 52 | 11.7 | 9.0 | 6.8 | 3.2 | .7 | .4 | |
| 48 | 5.3 | 79 | 4.72 | 59 | 65 | 81 | 7.7 | 7.6 | 6.6 | 6.8 | 1.8 | | |
| 49 | 5.0 | 49 | 0 | 36 | 36 | 56 | 8.8 | 8.0 | 7.0 | 4.0 | 1.3 | | |
| 50 | 4.8 | 73 | 0 | 70 | 56 | 77 | 7.8 | 6.2 | 5.7 | 5.7 | | | |
| 51 | 4.7 | 19 | 0 | 37 | 14 | 29 | 7.2 | 4.4 | 2.0 | | | | |
| 52 | 4.7 | 35 | 0 | 45 | 25 | 40 | 8.0 | 6.5 | 5.3 | 1.7 | | | |
| 53 | 4.9 | 28 | 0 | 23 | 18 | 44 | 11.5 | 6.8 | 4.7 | 1.8 | | | |
| 54 | 4.6 | 62 | 0 | 64 | 46 | 65 | 7.3 | 5.9 | 5.6 | 4.5 | | | |
| 55 | 4.3 | 39 | 0 | 44 | 26 | 42 | 8.1 | 6.8 | 5.4 | 2.3 | .2 | | |
| 56 | 4.2 | 47 | 0 | 38 | 27 | 49 | 9.4 | 6.4 | 5.4 | 2.8 | | | |
| 57 | 4.0 | 57 | 0 | 47 | 36 | 64 | 8.3 | 6.3 | 5.4 | 3.8 | | | |
| 58 | 4.0 | 67 | 0 | 45 | 40 | 61 | 6.8 | 5.7 | 5.3 | 4.4 | 1.2 | | |
| 59 | 3.9 | 55 | 0 | 41 | 34 | 67 | 9.3 | 6.6 | 5.5 | 3.5 | | | |
| 60 | 3.9 | 56 | 0 | 45 | 34 | 61 | 9.4 | 7.1 | 5.8 | 3.6 | | | |
| 61 | 3.9 | 57 | 0 | 35 | 33 | 61 | 9.3 | 7.7 | 6.4 | 3.7 | 1.2 | | |
| 62 | 3.9 | 65 | 0 | 37 | 36 | 60 | 7.6 | 6.6 | 6.0 | 1.5 | | | |
| 63 | 3.6 | 40 | 0 | 36 | 22 | 43 | 8.1 | 5.9 | 4.6 | 1.9 | .5 | | |
| 64 | N.C. | N.C. | 0 | N.C. | N.C. | N.C. | 8.1 | 5.4 | 4.2 | 2.3 | | | |
| 65 | 3.6 | 41 | 0 | 33 | 22 | 37 | 7.2 | 5.7 | 5.6 | 2.2 | .7 | | |
| 66 | 3.6 | 49 | 0.32 | 37 | 27 | 45 | 7.6 | 6.5 | 5.4 | 2.8 | .9 | | |
| 67 | 3.6 | 59 | 0 | 34 | 32 | 60 | 9.8 | 6.7 | 5.6 | 3.6 | 1.2 | | |
| 68 | 3.6 | 76 | 0 | 39 | 41 | 80 | 9.4 | 7.0 | 6.0 | 4.3 | 1.4 | | |
| 69 | 3.6 | 88 | 0 | 46 | 47 | 66 | 5.6 | 4.8 | 4.8 | 4.2 | 2.2 | (.4) | |
| 70 | 3.4 | 44 | 0 | 34 | 24 | 53 | 8.9 | 6.0 | 4.6 | 2.2 | | | |
| 71 | 3.3 | 43 | 0 | 33 | 22 | 50 | 8.5 | 5.7 | 4.3 | 2.0 | | | |
| 72 | N.C. | N.C. | N.C. | N.C. | N.C. | N.C. | 3.3 | 3.5 | 3.8 | 3.1 | 2.0 | 0.6 | |
| 73 | N.C. | N.C. | N.C. | N.C. | N.C. | N.C. | 3.1 | 3.4 | 3.4 | 4.0 | 4.6 | | |
| 74 | 3.1 | 78 | 0 | 44 | 37 | 57 | 6.7 | 5.4 | 5.1 | 3.9 | 1.6 | (.2) | |
| 75 | 2.9 | 78 | 0 | 31 | 35 | 78 | 12.3 | 8.4 | 6.3 | 3.8 | 1.8 | (.3) | |
| 76 | 2.9 | 83 | 0 | 42 | 37 | 63 | 6.0 | 6.4 | 5.6 | 3.8 | 1.8 | | |
| 77 | 2.8 | 96 | 0 | 29 | 39 | 90 | 11.5 | 8.1 | 6.5 | 4.1 | 2.2 | | |
| 78 | 2.7 | 71 | 0 | 34 | 29 | 62 | 8.8 | 6.5 | 5.1 | 3.1 | 1.3 | | |
| 79 | 2.7 | 74 | 0 | 43 | 31 | 50 | 5.6 | 4.4 | 4.0 | 3.2 | 1.1 | | |
| 80 | 2.7 | 112 | 0.35 | 49 | 48 | 92 | 12.5 | 10.0 | 6.7 | 3.4 | 2.0 | | |
| 81 | 2.6 | 38 | 0 | 22 | 12 | 32 | 7.3 | 4.2 | 3.1 | 1.4 | | | |
| 82 | 2.5 | 123 | 0 | 41 | 48 | 98 | 10 9 | 8.0 | 6.4 | 4.2 | 2.5 | | |
| 83 | 2.4 | 61 | 0 | 26 | 21 | 41 | 7.3 | 5.2 | 4.1 | 2.4 | 1.1 | .4 | |
| 84 | 2.4 | 63 | 0 | 28 | 23 | 49 | 8.3 | 5.8 | 4.6 | 2.6 | 1.1 | .4 | |
| 85 | 2.4 | 126 | 0 | 39 | 47 | 105 | 12.4 | 8.4 | 6.6 | 4.1 | 2.5 | | |
| 86 | 2.2 | 51 | 0 | 30 | 14 | 32 | 5.6 | 3.5 | 2.9 | 1.7 | .8 | | |
| 87 | 2.1 | 84 | 0 | 32 | 23 | 45 | 5.9 | 4.2 | 3.6 | 2.6 | 1.4 | | |
| 88 | 0 | 121 | 0.01 | 39 | 38 | 89 | 13.5 | 8.9 | 6.1 | 3.1 | 2.0 | | |
| 89 | 1.9 | 72 | 0 | 28 | 20 | 38 | 5.7 | 4.4 | 3.6 | 2.3 | 1.1 | .4 | .2 |
| 90 | 1.9 | 90 | 0 | 27 | 25 | 48 | 6.3 | 5.1 | 4.2 | 2.6 | 1.3 | .6 | (.3) |
| 91 | 1.9 | 92 | 0 | 46 | 28 | 54 | 5.3 | 3.5 | 2.9 | 2.4 | | | |
| 92 | 1.7 | 116 | 7.03 | 37 | 31 | 49 | 2.1 | 3.3 | 3.7 | 3.0 | 1.8 | .7 | .3 |
| 93 | 1.6 | 101 | 1.02 | 27 | 24 | 47 | 4.8 | 5.4 | 4.6 | 2.5 | 1.3 | .6 | (.3) |
| 94 | 1.5 | 101 | 0 | 41 | 18 | 42 | 7.4 | 4.8 | 3.3 | (1.8) | | | |
| 95 | 1.3 | 126 | 0 | 25 | 24 | 46 | 3.7 | 3.9 | 3.5 | 2.3 | 1.3 | .6 | |
| 96 | 1.2 | 153 | 0 | 27 | 27 | 70 | 7.6 | 5.8 | 4.6 | 2.7 | 1.5 | .6 | |
| 97 | 1.1 | 76 | 0.04 | 32 | 13 | 21 | 2.4 | 2.3 | 2.0 | 1.4 | .7 | .2 | .1 |
| 98 | 0.9 | 162 | 0 | 26 | 22 | 55 | 5.1 | 4.7 | 3.9 | 2.3 | 1.2 | .6 | .4 |
| 99 | 0.7 | 2.9 | 0.4 | 30 | 24 | 63 | 5.5 | 4.2 | 3.4 | 2.2 | 1.3 | .6 | |

TABLE Xb.—INTENSITY LIFETIME PERFORMANCE SUMMARY OF TCPO CHEMILUMINESCENCE

| No. | Q.Y. ($10^2$ E. mole$^{-1}$) | L.C. (lm. hr. l$^{-1}$) | Catalyst [b] [c] ($10^2$ M) | Solvents [d] (percent by volume) | [TCPO] (M×$10^2$) | [H$_2$O$_2$] (M×$10^2$) | [BPEA] (M×$10^3$) |
|---|---|---|---|---|---|---|---|
| 1 | 5.86 | 54 | 0.15 Na SAL, satd. DACTA | EB(90)-3-M-3-P(10) | 3.0 | 7.5 | 3.0 |
| 2 | 8.86 | 82 | 0.125 Na SAL | EB(92)-2-Oct(8) | 3.0 | 7.5 | 3.0 |
| 3 | 8.52 | 79 | 0.125 Na SAL | EB(92)-2-Oct(8) | 3.0 | 7.5 | 3.0 |
| 4 | 6.58 | 61 | 0.150 Na SAL | EB(90)-3-M-3-P(10) | 3.0 | 7.5 | 2.8 |
| 5 | 9.25 | 86 | 39.3 mgs. NA THS, 10.8 mgs. mannose | EB(92)-2-Oct(8) | 3.0 | 7.5 | 3.0 |
| 6 | 5.70 | 53 | .075 TBAS, 5.0 TBAP | EB(75)-3-M-3-P(25) | 3.0 | 7.5 | 3.0 |
| 7 | 7.10 | 66 | 0.150 Na SAL | EB(90)-t-BuOH(10) | 3.0 | 7.5 | 2.8 |
| 8 | 6.01 | 56 | 0.100 TBAS | EB(75)-3-M-3-P(25) | 3.0 | 7.5 | 3.0 |
| 9 | 7.71 | 72 | 0.10 TEAB | EB(75)-3-M-3-P(25) | 3.0 | 7.5 | 3.0 |
| 10 | 5.33 | 49 | .125 Na SAL, 5.0 TBAP | EB(75)-3-M-3-P(25) | 3.0 | 7.5 | 3.0 |
| 11 | 5.35 | 50 | 0.100 TBAS | EB(75)-3-M-3-P(25) | 3.0 | 7.5 | 3.0 |
| 12 | 9.04 | 84 | 0.05 TBAS | EB(75)-3-M-3-P(25) | 3.0 | 7.5 | 3.0 |
| 13 | 6.26 | 58 | .125 Na SAL, 1.0 TBAP | EB(75)-3-M-3-P(25) | 3.0 | 7.5 | 3.0 |
| 14 | 11.24 | 125 | 5.0 TBAP | EB(90)-3-M-3-P(10) | 3.6 | 7.5 | 3.0 |
| 15 | 6.01 | 54 | 0.30 Na SAL, 3.0 SA | EB(80)-3-M-3-P(20) | 3.0 | 7.5 | 2.0 |
| 16 | 4.46 | 40 | .183 BTMAH, .40 TCBA | EB(90)-t-BuOH(10) | 3.0 | 15.0 | 2.0 |
| 17 | 6.87 | 62 | .25 BTMAH, .283 H$_3$PO$_4$ | EB(90)-t-BuOH(10) | 3.0 | 15.0 | 2.0 |
| 18 | 8.75 | 76 | 0.05 TBAS | EB(80)-3-M-3-P(20) | 2.8 | 7.0 | 2.8 |
| 19 | 4.34 | 39 | .183 BTMAH | EB(90)-t-BuOH(10) | 3.0 | 15.0 | 2.0 |
| 20 | 6.82 | 63 | 0.075 TBAS, 5.0 φ$_3$PO | EB(75)-3-M-3-P(25) | 3.0 | 7.5 | 3.0 |
| 21 | 4.85 | 44 | 0.30 Na SAL | EB(80)-3-M-3-P(20) | 3.0 | 7.5 | 2.0 |
| 22 | 8.16 | 76 | 0.125 Na SAL | EB(75)-3-M-3-P(25) | 3.0 | 24.0 | 3.0 |
| 23 | 8.88 | 77 | 0.05 TBAS | EB(70)-3-M-3-P(30) | 2.8 | 7.0 | 2.8 |
| 24 | 7.45 | 69 | 0.075 TBAS | EB(75)-3-M-3-P(25) | 3.0 | 7.5 | 3.0 |
| 25 | 5.62 | 52 | 0.30 Na SAL | EB(90)-t-BuOH(10) | 3.0 | 7.5 | 3.0 |
| 26 | 8.83 | 76 | 0.05 TBAS | EB(88)-3-M-3-P(12) | 2.8 | 7.0 | 2.8 |
| 27 | 11.13 | 103 | 10.0 TBAP | EB(75)-3-M-3-P(25) | 3.0 | 7.5 | 3.0 |
| 28 | 5.50 | 51 | 0.40 Na SAL | EB(90)-t-BuOH(3)-1,2-Prdiol(7) | 3.0 | 10.0 | 3.0 |
| 29 | 12.11 | 112 | 5.0 TBAP | EB(75)-3-M-3-P(25) | 3.0 | 7.5 | 3.0 |
| 30 | 5.31 | 49 | 0.10 TBAS, 1.0 SA | EB(75)-3-M-3-P(25) | 3.0 | 7.5 | 3.0 |
| 31 | 6.99 | 65 | 0.125 Na SAL | EB(75)-3-M-3-P(25) | 3.0 | 3.3 | 3.0 |
| 32 | 9.00 | 84 | 0.075 TEBA | EB(75)-3-M-3-P(25) | 3.0 | 7.5 | 3.0 |
| 33 | 7.32 | 68 | 0.125 Na SAL | EB(75)-3-M-3-P(25) | 3.0 | 45.0 | 3.0 |
| 34 | 6.89 | 64 | 0.125 Na SAL | EB(75)-3-M-3-P(25) | 3.0 | 7.5 | 3.0 |
| 35 | 7.75 | 72 | 0.15 Na SAL, 14.0 H$_2$O | EB(90)-t-BuOH(10) | 3.0 | 7.5 | 3.0 |
| 36 | 8.30 | 77 | 0.125 Na SAL | EB(75)-3-M-3-P(25) | 3.0 | 7.5 | 3.0 |
| 37 | 12.51 | 116 | 5.0 TBAP, 0.5 ACAN | EB(75)-3-M-3-P(25) | 3.0 | 7.5 | 3.0 |
| 38 | 4.05 | 37 | .183 BTMAE, .20 TCBA | EB(90)-t-BuOH(10) | 3.0 | 15.0 | 2.0 |
| 39 | 7.98 | 74 | 0.15 BTMATCB | EB(90)-3-M-3-P(10) | 3.0 | 7.5 | 3.0 |
| 40 | 7.78 | 72 | 0.125 Na SAL | EB(75)-3-M-3-P(25) | 3.0 | 7.5 | 3.0 |
| 41 | 7.66 | 71 | 0.125 Rb SAL, 5.0 φ$_3$PO | EB(75)-3-M-3-P(25) | 3.0 | 7.5 | 3.0 |
| 42 | 8.42 | 78 | 0.125 Na SAL, 0.1 SA | EB(75)-3-M-3-P(25) | 3.0 | 7.5 | 3.0 |
| 43 | 7.59 | 69 | 0.10 Na SAL | EB(80)-3-M-3-P(20) | 3.0 | 7.5 | 2.0 |
| 44 | 9.97 | 93 | 0.05 TEAB | EB(75)-3-M-3-P(25) | 3.0 | 7.5 | 3.0 |
| 45 | 7.25 | 65 | .073 BTMAH, .40 TCBA | EB(90)-t-BuOH(10) | 3.0 | 15.0 | 2.0 |
| 46 | 6.44 | 60 | 0.15 Na SAL, 28.0 H$_2$O | EB(90)-t-BuOH(10) | 3.0 | 7.5 | 3.0 |
| 47 | 10.06 | 91 | .167 BTMAH, .283 H$_3$PO$_4$ | EB(90)-t-BuOH(10) | 3.0 | 15.0 | 2.0 |
| 48 | 11.82 | 110 | 5.0 TBAP, 1.0 ACAN | EB(75)-3-M-3-P(25) | 3.0 | 7.5 | 3.0 |
| 49 | 10.67 | 99 | 5.0 TBAP, .08 SA, .005 TBAH | EB(92)-2-Oct(8) | 3.0 | 7.5 | 3.0 |
| 50 | 8.70 | 81 | 0.125 Na SAL | EB(75)-3-M-3-P(25) | 3.0 | 7.5 | 3.0 |
| 51 | 4.00 | 37 | 0.25 TBAS | o-DCB(75)-3-M-3-P(25) | 3.0 | 7.5 | 3.0 |
| 52 | 6.03 | 56 | .10 TBAS, 2.50 SA | EB(75)-3-M-3-P(25) | 3.0 | 7.5 | 3.0 |
| 53 | 8.69 | 78 | .073 BTMAH | EB(90)-t-BuOH(10) | 3.0 | 15.0 | 2.0 |
| 54 | 7.68 | 71 | 0.125 Na SAL | EB(75)-3-M-3-P(25) | 3.0 | 7.5 | 3.0 |
| 55 | 6.55 | 61 | .10 TBAS, 5.00 SA | EB(75)-3-M-3-P(25) | 3.0 | 7.5 | 3.0 |
| 56 | 7.66 | 71 | 0.15 BTMATCB | EB(90)-t-BuOH(10) | 3.0 | 7.5 | 3.0 |
| 57 | 8.37 | 78 | 0.125 Na SAL, 0.50 SA | EB(75)-3-M-3-P(25) | 3.0 | 7.5 | 3.0 |
| 58 | 9.61 | 89 | 5.0 TBAP, .08 SA, .01 TBAH, 19.3 mgs. Me$_4$NBF$_4$ | EB(92)-2-Oct(8) | 3.0 | 7.5 | 3.0 |
| 59 | 8.83 | 82 | 0.125 Na SAL, 1.00 SA | EB(75)-3-M-3-P(25) | 3.0 | 7.5 | 3.0 |
| 60 | 8.35 | 75 | .050 Na SAL | EB(80)-3-M-3-P(20) | 3.0 | 7.5 | 2.0 |
| 61 | 10.16 | 94 | 9.0 TBAP, .08 SA, .01 TBAH | EB(92)-2-Oct(8) | 3.0 | 7.5 | 3.0 |
| 62 | 10.68 | 99 | 9.0 TBAP, .08 SA, .01 TBAH | EB(92)-2-Oct(8) | 3.0 | 7.5 | 3.0 |
| 63 | 6.64 | 60 | .17 TBAH, .30 TA | EB(90)-t-BuOH(10) | 3.0 | 15.0 | 2.0 |
| 64 | 7.76 | 70 | 0.17 TBAH, 1.50 TA | EB(90)-t-BuOH(10) | 3.0 | 15.0 | 2.0 |
| 65 | 7.11 | 66 | 9.0 TBAP, .08 SA, .01 TBAH | EB(92)-2-Oct(8) | 3.0 | 3.7 | 3.0 |
| 66 | 7.98 | 74 | | EB(75)-3-M-3-P(25) | 3.0 | 45.0 | 3.0 |
| 67 | 10.11 | 94 | 5.0 TBAP, .08 SA, .01 TBAH, 26.3 mgs. Me$_4$NPF$_6$ | EB(92)-2-Oct(8) | 3.0 | 7.5 | 3.0 |
| 68 | 11.54 | 107 | 1.0 TBAP, .08 SA, .01 TBAH | EB(92)-2-Oct(8) | 3.0 | 7.5 | 3.0 |
| 69 | 10.91 | 101 | 9.0 TBAP, .08 SA, .01 TBAH | EB(92)-2-Oct(8) | 3.0 | 10.0 | 3.0 |
| 70 | 7.63 | 69 | 0.10 TBAS | o-DCB(75)-3-M-3-P(25) | 3.0 | 7.5 | 3.0 |
| 71 | 7.30 | 66 | 0.10 TBAS | o-DCB(75)-3-M-3-P(25) | 3.0 | 7.5 | 3.0 |
| 72 | 11.67 | 108 | 2.0 mgs. KOOCH | EB(92)-2-Oct(8) | 3.0 | 7.5 | 3.0 |
| 73 | 10.64 | 99 | 17.3 mgs. KOOCH | EB(92)-2-Oct(8) | 3.0 | 7.5 | 3.0 |
| 74 | 9.06 | 84 | 9.0 TBAP, .08 SA, .01 TBAH, 19.3 mgs. Me$_4$NBF$_4$ | EB(92)-2-Oct(8) | 3.0 | 7.5 | 3.0 |
| 75 | 12.00 | 111 | 0.3 TBAP | EB(75)-3-M-3-P(25) | 3.0 | 7.5 | 3.0 |
| 76 | 9.47 | 88 | 0.125 Na SAL, 5.0 SA | EB(75)-3-M-3-P(25) | 3.0 | 7.5 | 3.0 |
| 77 | 14.40 | 134 | 0.01 TBAS | EB(75)-3-M-3-P(25) | 3.0 | 7.5 | 3.0 |
| 78 | 9.63 | 87 | 0.05 Na SAL, 0.50 SA | EB(80)-3-M-3-P(20) | 3.0 | 7.5 | 2.0 |
| 79 | 7.65 | 71 | 8.0 TBAP, .08 SA, .02 TBAH | EB(92)-2-Oct(8) | 3.0 | 7.5 | 3.0 |
| 80 | 10.50 | 97 | 25.3 mgs. CsCl | EB(75)-3-M-3-P(25) | 3.0 | 7.5 | 3.0 |
| 81 | 5.85 | 54 | 0.028 TBAH, 0.4 SA | EB(92)-2-Oct(8) | 3.0 | 7.5 | 3.0 |
| 82 | 12.53 | 116 | 0.80 TBAP | EB(75)-3-M-3-P(25) | 3.0 | 7.5 | 3.0 |
| 83 | 8.93 | 83 | | EB(90)-3-M-3-P(10) | 3.0 | 7.5 | 3.0 |
| 84 | 7.53 | 84 | | EB(90)-3-M-3-P(10) | 3.0 | 7.5 | 3.0 |
| 85 | 13.19 | 122 | 1.0 TBAP | EB(75)-3-M-3-P(10) | 3.0 | 7.5 | 3.0 |
| 86 | 5.16 | 48 | 0.45 K TCBA | EB(90)-t-BuOH(10) | 3.0 | 7.5 | 3.0 |
| 87 | 7.52 | 70 | 0.30 K TCBA | EB(90)-t-BuOH(10) | 3.0 | 7.5 | 3.0 |
| 88 | 10.54 | 98 | 18.1 mgs. RbCl | EB(75)-3-M-3-P(25) | 3.0 | 7.5 | 3.0 |
| 89 | 7.97 | 74 | Satd. DACTA | EB(90)-3-M-3-P(10) | 3.0 | 7.5 | 3.0 |
| 90 | 9.72 | 90 | 0.10 ACAN | EB(75)-3-M-3-P(25) | 3.0 | 7.5 | 3.0 |
| 91 | 7.03 | 61 | 0.51 Rb SAL | EB(70)-3-M-3-P(30) | 2.8 | 7.0 | 2.8 |
| 92 | 9.06 | 84 | 0.50 ACAN | EB(75)-3-M-3-P(25) | 3.0 | 7.5 | 3.0 |
| 93 | 9.45 | 88 | 0.10 SA | EB(75)-3-M-3-P(25) | 3.0 | 7.5 | 3.0 |
| 94 | 4.85 | 45 | 0.81 SA, .055 TBAH | EB(92)-2-Oct(8) | 3.0 | 7.5 | 3.0 |
| 95 | 10.35 | 96 | | EB(75)-3-M-3-P(25) | 3.0 | 3.3 | 3.0 |
| 96 | 10.86 | 101 | 5.0 φ$_3$PO | EB(75)-3-M-3-P(25) | 3.0 | 7.5 | 3.0 |
| 97 | 13.04 | 40 | | EB(90)-3-M-3-P(10) | 1.0 | 7.5 | 3.0 |
| 98 | 9.16 | 85 | 1.0 ACAN | EB(75)-3-M-3-P(25) | 3.0 | 7.5 | 3.0 |
| 99 | 8.8 | 81 | | EB(75)-3-M-3-P(25) | 3.0 | 7.5 | 3.0 |

[b] Na SAL=Sodium salicylate. DACTA=1,2-Diaminocyclohexanetetraacetic acid. TBAS=Tetrabutylammonium salicylate. TBAP=Tetrabutylammonium perchlorate. SA=Salicylic acid. BTMAH=Benzyltrimethylammonium hydroxide. Na THS=Sodium tetrahydroxysuccinate.

[c] TEAB=Tetraethylammoniumbenzoate. φ$_3$PO=Triphenylphosphine oxide. TCBA=2,3,6-Trichlorobenzoic acid. TBAH=Tetrabutylammonium hydroxide. TA=Tartaric acid. Rb=Rubidium. K=Potassium. ACAN=Acetanilide. BTMATCP=Benzyltrimethylammonium 2,3,6-trichlorobenzoate.

[d] EB=Ethyl benzoate. 3-M-3-P=3-Methyl-3-pentanol. 2-Oct.=2-Octanol. t-BuOH=t-Butyl alcohol. o-DCB=o-Dichlorobenzene.

TABLE XI.—HIGH PERFORMANCE, CHEMICAL LIGHTING SYSTEMS [a]

| Exp. [b] No. | Catalyst | $I_c$ [c] | $T_o$ [d] | $L_c$ [e] | $L$ [f] | $Q$ [g] | $I_{max}$ [h] | Time [i]—Intensity [j] vs. time | | | | | |
|---|---|---|---|---|---|---|---|---|---|---|---|---|---|
| | | | | | | | | 5 | 10 | 20 | 30 | 60 | 120 |
| 4 | Sodium salicylate [k] (0.00150 M) | 14 | 15 | 32 | 61 | 6.6 | 78 | 18 | 18 | 8 | 0.5 | Low | |
| 9 | Tetraethylammonium benzoate (0.001 M) | 11 | 21 | 36 | 72 | 7.7 | 46 | 19 | 16 | 11 | 4.8 | Low | |
| 12 | Tetrabutylammonium salicylate (0.0005 M) | 9.9 | 26 | 39 | 84 | 9.0 | 49 | 18 | 15 | 12 | 8.2 | 0.2 | Low |
| 14 | Tetrabutylammonium [k,r] perchlorate (0.05 M) | 9.6 | 46 | 70 | 125 | 11.2 | 17 | 16 | 15 | 13 | 12 | 6 | Low |
| 39 | Benzyltrimethylammonium 2,3,6-trichlorobenzoate (0.0015 M) [q] | 5.9 | 34 | 31 | 74 | 8.0 | 38 | 15 | 11 | 8.1 | 6.6 | 1.5 | |
| 40 | Sodium salicylate (0.00125 M) | 5.9 | 49 | 45 | 72 | 7.8 | 44 | 11 | 9.0 | 7.5 | 6.9 | 2.2 | Low |
| 54 | | 4.6 | 62 | 46 | 71 | 7.7 | 36 | 10 | 7.3 | 5.9 | 5.6 | 4.5 | Low |
| 42 | Sodium salicylate (0.00125 M) and salicylic acid (0.001 M) | 5.6 | 51 | 43 | 78 | 8.4 | 42 | 12 | 8.7 | 7.3 | 6.9 | 3.5 | |
| 55 | Tetrabutylammonium salicylate (0.001 M) and salicylic acid (0.05 M) | 4.3 | 39 | 26 | 61 | 6.6 | 8.5 | 9.1 | 8.3 | 6.8 | 5.4 | 2.3 | 0.2 |
| 70 | Tetrabutylammonium [p] salicylate (0.001 M) | 3.4 | 44 | 24 | 69 | 7.6 | 44 | 13 | 8.9 | 6.0 | 4.6 | 2.2 | |
| 76 | Sodium salicylate (0.00125 M) and salicylic acid (0.05 M) | 2.9 | 83 | 37 | 88 | 9.5 | 7.4 | 6.3 | 6.3 | 6.4 | 5.6 | 3.8 | 1.8 |
| 77 | Tetrabutylammonium salicylate (0.0001 M) | 2.8 | 96 | 39 | 134 | 14.4 | 22 | 16 | 12 | 8.1 | 6.5 | 4.1 | 2.2 |
| 82 | Tetrabutylammonium perchlorate (0.008 M) | 2.5 | 123 | 48 | 116 | 12.5 | 12 | 12 | 11 | 8.0 | 6.4 | 4.2 | 2.5 |
| 99 | None | 0.7 | 219 | 24 | 81 | 8.8 | 60 | 5.8 | 5.5 | 4.2 | 3.4 | 2.2 | 1.3 |

[a] Reactions of 0.030 M bis(2,4,6-trichlorophenyl)oxalate (TCPO), 0.003 M 9,10-bis(phenylethynyl)anthracene (BPEA) and 0.075 M $H_2O_2$ in 75 vol. percent ethyl benzoate-25 vol. percent 3-methyl-3-pentanol (except where noted) at 25° C.
[b] Numbers from table.
[c] Characteristic intensity (foot lamberts cm.$^{-1}$).
[d] Characteristic lifetime (minutes).
[e] Characteristic light capacity (lumen hours liter$^{-1}$).
[f] Total light capacity (lumen hours liter $^{-1}$).
[g] Quantum yield ($10^2$ einsteins mole $^{-1}$ based on TCPO).
[h] Maximum intensity (foot lamberts cm.$^{-1}$).
[i] Reaction time in minutes.
[j] Foot lamberts cm.$^{-1}$.
[k] 90% ethyl benzoate-10% 3-methyl-3-pentanol.
[p] 75% o-dichlorobenzene-25% 3-methyl-3-pentanol.
[q] 90% ethyl benzoate-10% t-butyl alcohol.
[r] [TCPO] was 0.036 M.

What is claimed is:

1. In a composition for reaction with hydrogen peroxide to produce a high intensity chemiluminescent light emission having the ingredients a bisaryl oxalate ester, an organic fluorescent compound, and an organic solvent for said ingredients, the improvement which comprises a catalyst which is a weakly basic salt of an acid having a log of the pKa value in water of 1 to 6, said catalyst being effective to provide a more uniform light output.

2. The composition of claim 1 wherein said oxalate ester is a substituted aryl oxalate ester.

3. The composition of claim 2 wherein said oxalate ester is bis(2,4,6-trichlorophenyl)oxalate.

4. The composition of claim 1 wherein said organic fluorescent compound is 9,10-bis(phenylethynyl)anthracene.

5. The composition of claim 1 wherein said organic fluorescent compound is 9,10-diphenyl-anthracene.

6. The composition of claim 1 wherein said weakly basic salt is sodium salicylate.

7. The composition of claim 1 wherein said weakly basic salt is tetrabutylammonium salicylate.

8. In a process for producing a highly intense chemiluminescent light from a reaction of the ingredients comprising: (1) a bis aryl oxalate ester, (2) hydrogen peroxide, (3) an organic fluorescent compound, and (4) an organic solvent for said ingredients, the step of adding to said reaction of a catalyst which is weakly basic salt of an acid having a log of the pKa value in water of 1 to 6.

References Cited

UNITED STATES PATENTS 2,420,286  5/1947  Lacey ______________ 252—188.3

JOHN D. WELSH, Primary Examiner